Patented Apr. 20, 1926.

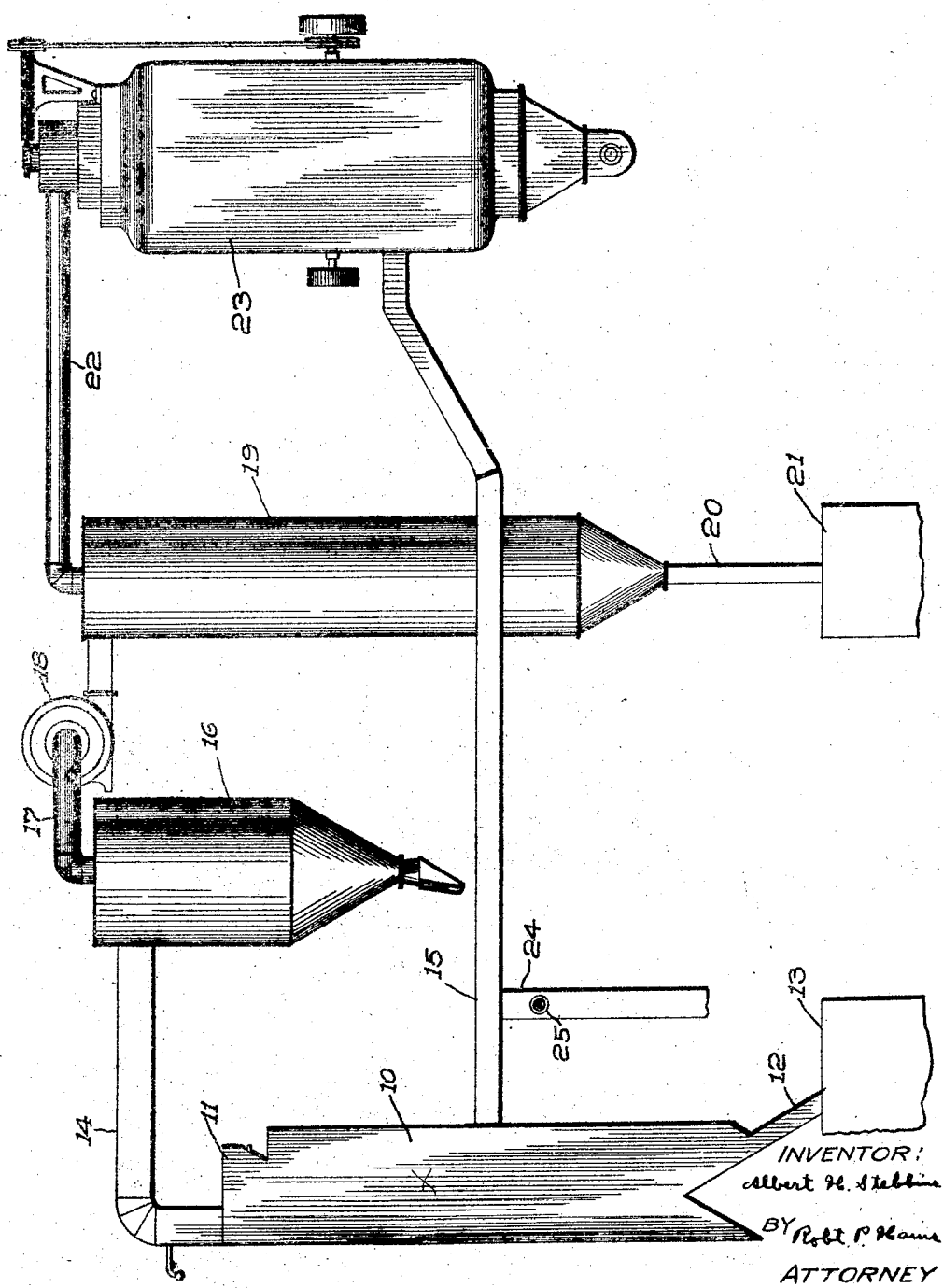

1,581,239

UNITED STATES PATENT OFFICE.

ALBERT H. STEBBINS, OF LOS ANGELES, CALIFORNIA.

DUST-EXTRACTOR UNIT.

Application filed July 15, 1922. Serial No. 575,324.

*To all whom it may concern:*

Be it known that I, ALBERT H. STEBBINS, a citizen of the United States, residing at Los Angeles, in the county of Los Angeles and State of California, have invented an Improvement in Dust-Extractor Units, of which the following description, in connection with the accompanying drawings, is a specification, like characters on the drawings representing like parts.

This invention relates to a dust extractor unit consisting of a plurality of dust extractors connected in series.

In the treatment of ores and other materials it is often desirable to remove the dust and fine particles from the coarser particles. This may be done by passing air through the materials to be treated so that the dust and lighter particles will be picked up by the air. The dust laden air may then be passed through dust extractors to remove the dust from the air.

However, in treating powdered sulphur and other materials of a combustible nature, there is danger of an explosion being caused by ignition of the inflammable dust suspended in the air, and it may therefore be desirable to use a non-inflammable gas, such as carbon dioxide, in place of air to remove the dust and lighter particles from the material being treated. But carbon dioxide is destructive to human life and therefore must be prevented from escaping into the atmosphere.

Having these matters in mind, the principal feature of the present invention resides in a dust extractor unit, comprising a series of closed dust extractors connected in a closed circuit so that the non-explosive gas used to carry the dust and finer particles will be confined within the dust extractor unit for repeated use.

Other features of the invention in addition to the above will be hereinafter described in connection with the accompanying drawing which illustrates one good practical form thereof.

In the drawing several dust extractors are shown in side elevation and are connected in series by conduits.

The construction and operation of the different dust extractors within the unit may be varied as found desirable, but each dust extractor in the series should be adapted to remove finer dust than the dust extractor that precedes it.

In the construction shown, the first dust extractor in the series is designated by 10, and preferably is adapted to remove dust and fine particles from the materials delivered thereto. This dust extractor has a closed casing into which the materials to be treated are delivered by a hopper 11, and the construction of the casing is such that as the materials pass downwardly therein they are subjected to the separating action of air passing upward within the casing. The heavier particles that settle within the casing are discharged therefrom thru the pipe 12 that leads into a closed bin 13, while the dust and lighter particles are conveyed from the dust extractor 10 thru the conduit 14 leading from the upper end thereof, and baffle plates (not shown) may be provided within the casing to insure the exposure of all particles of the materials to the action or the rising air. The air or non-combustible gas that is passed through the materials being treated within the casing 10 may be delivered thereto by a conduit 15, and this air or gas may be drawn through the materials and upwardly through the conduits 14 by suction means to be described.

The dust laden air or gas may pass from the dust extractor 10 to the suction dust extractor 16 where the heavier dust will be removed from the air or gas. The dust extractor 16 may be similar in construction and operation to the dust collector disclosed and claimed in my Patent No. 1,509,910, granted Sept. 30, 1924, and the dust and fine particles removed from the air or gas within this dust extractor will settle in the lower portion thereof, while the air or gas will be sucked from this dust extractor through the conduit 17 to the fan 18.

The air or gas with the dust that remains therein passes through the fan 18 and is forced thereby into a blast dust extractor 19 for further treatment, and the dust that is extracted from the air therein may pass downward through a pipe 20 into a closed bin 21. The dust extractor 19 may be similar to that disclosed and claimed in my Patent No. 1,509,911, granted Sept. 30, 1924.

Should it be desirable further to remove the dust from the air or gas that leaves the dust extractor 19, the same may be conducted by the conduit 22 to a dust extractor 23 preferably provided with fabric tubes having a mesh through which the air or gas will pass leaving the dust in the tubes. The tubes or other means within the filter type of dust extractor 23 for removing dust from the air or gas are enclosed in the casing shown so that the air or gas is prevented from escaping to the atmosphere, and the conduit 15 may conduct the air or gas from which the dust has been removed back to the dust extractor 10. The construction of the dust extractor 23 may be similar to that shown and described in my Patent No. 1,509,912, granted Sept. 30, 1924.

The number of dust extractors provided in the unit may be varied as desired, and the fan 18 in the construction shown serves to suck the dust laden air or gas through the dust extractors 10 and 16, and to blow the dust laden air or gas through the dust extractors 19 and 23.

The gaseous fluid such as air, carbon dioxide gas or other non-combustible gas may be introduced into the closed circuit by a pipe 24 controlled by a valve 25 and leading to the conduit 15. All of the dust extractors shown are air tight in construction, and the air or gas therein may be forced by the fan 18 continuously around the closed circuit so that it will remove dust and lighter particles from the materials treated in the dust extractor 10, and will deposit this dust and lighter particles within the dust extractors 16, 19 and 23.

It is found that if heavy coarse particles are passed through a suction fan they are very injurious to the fan blades. The present arrangement by which the suction dust extractor 16 is positioned between the fan 18 and the material treating dust extractor 10 is therefore highly desirable, as the dust extractor 16 serves to remove the heavier particles from the air or gas before they reach the fan.

What is claimed is:

A dust extractor unit for separating and grading materials, comprising in combination, a series of separate closed dust extractors connected in an endless closed air-tight circuit and including, a dust extractor for subjecting the materials to the first treatment and consisting of an upstanding casing having a feed hopper at its upper end and constructed to pass a gaseous fluid thru the materials as they pass downwardly within the casing under the action of gravity, a fan for exhausting from said casing the dust laden gaseous fluid and for producing a flow of the gaseous fluid repeatedly thru the entire air tight dust extracting unit, a suction dust extractor interposed between the suction side of the fan and the first dust extractor for removing the heavier and coarser particles before they reach the fan, a blast dust extractor connected to the discharge side of the fan for removing the fine particles remaining in the gaseous fluid, and a dust extractor of the filter type interposed between the blast dust extractor and first mentioned dust extractor for removing the very fine dust before the gaseous fluid is returned to the first dust extractor.

In testimony whereof, I have signed my name to this specification.

ALBERT H. STEBBINS.